Jan. 15, 1952  R. M. PIERCE  2,582,717
WINDSHIELD WIPER
Filed July 5, 1947
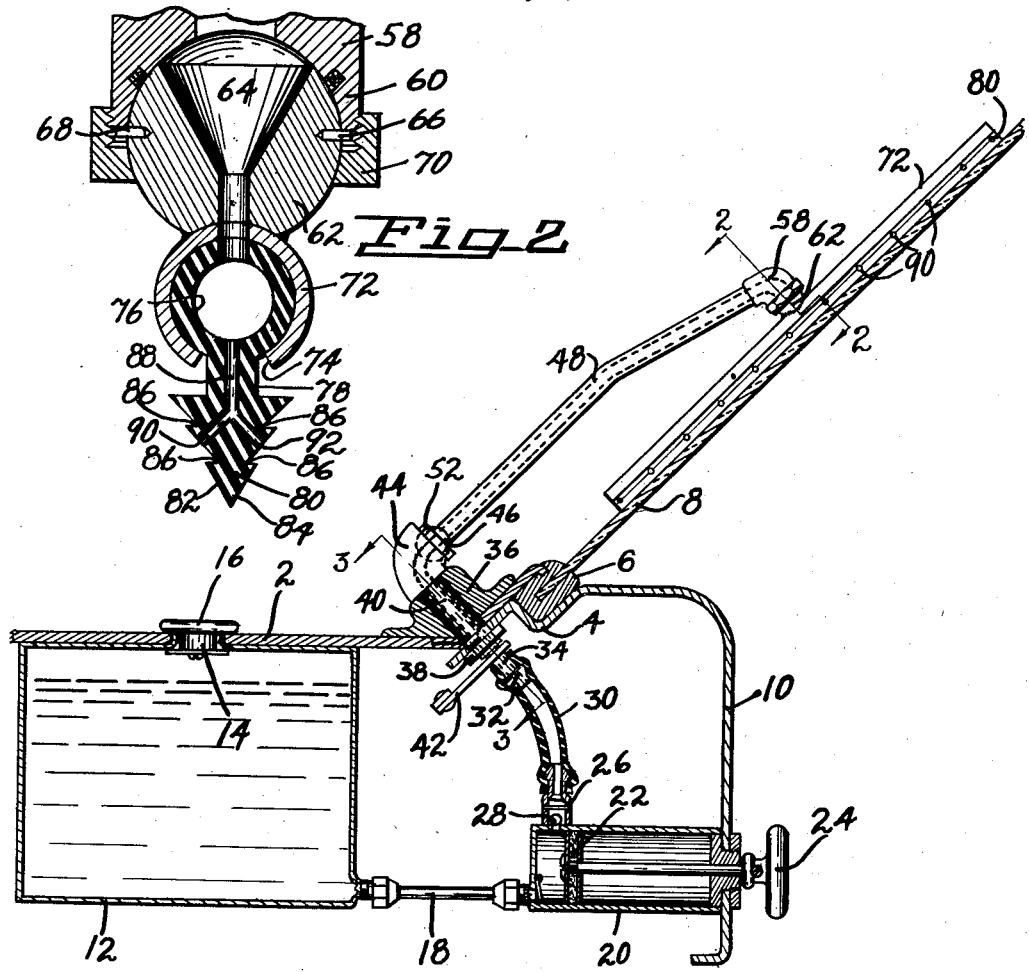
Roy M. Pierce
Inventor
By Glenn S. Fish
Attorney Patented Jan. 15, 1952

2,582,717

UNITED STATES PATENT OFFICE 2,582,717

WINDSHIELD WIPER

Roy M. Pierce, Spokane, Wash.

Application July 5, 1947, Serial No. 759,218

2 Claims. (Cl. 15—250.4)

My present invention relates to an improved windshield wiper and especially to a wiper so designed as to discharge water or other fluid through the wiper blade so that the wiper may properly clean the glass of dust, dirt and grime when it is not raining.

Automatic wipers of the type generally employed on modern automobiles will operate, of course, when the glass is dry, but they cannot clean the glass in such a state.

The purpose of my invention is therefore to offer a wiper of such character that liquid may be pumped through the upper shaft, the wiper arm, and discharged through the wiper blade in a unique and practical manner.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a vertical sectional view through an automobile cowling and windshield showing the device of my invention.

Fig. 2 is a sectional view at line 2—2 of Fig. 1.

Fig. 3 is a sectional view at line 3—3 of Fig. 1.

Fig. 4 is an enlarged detail sectional view of the upper arm support.

Referring now to the drawings wherein I have illustrated the present preferred embodiment of the device of my invention, I have shown the cowling 2 of a vehicle recessed at 4 to receive the molding 6 for windshield 8 and curving down to form the instrument panel 10.

A supply tank 12 having an inlet port 14, closed by cap 16 communicates through pipe 18 to the cylinder 20 having a piston 22 and actuating knob 24 extending through the panel 10 for easy access.

The outlet nipple 26 has a one way ball valve 28 and is connected by hose 30 to the nipple 32 of hollow shaft 34 positioned through the cowling and secured in the bracket 36 by nut 38. A suitable bearing 40 journals the shaft which is oscillated by the arm 42 by suitable motor means, not shown.

An elbow 44 on the shaft receives the spherical end 46 of the hollow wiper arm 48 in the socket 50 secured by collar 52, and the pin 54 in the end 46 is pressed by spring 56 to urge the arm toward the windshield.

At the upper end of the hollow arm 48 I secure an elbow 58 having a socket 60 for the ball 62 formed with a tapered passage 64, and the ball is pivotally mounted in the socket on opposed pins 66 and 68, and secured by collar 70.

The casing 72 secured to the ball and circular in cross section is slotted at 74 to receive the tubular portion 76 of the wiper blade and the ends of the tube are closed to confine the liquid dispensed therein from the wiper arm and socket.

A restricted neck 78 connects the blade 80 which is triangular in cross section, the faces 82 and 84 being recessed at 86 and the lateral passages 88 fork into passages 90 and 92 in the intermediate face sections 82 and 84.

It will be obvious that liquid under pressure will pass through the elbow 44, the wiper arm 48 and the elbow 58 to the wiper 80. From the formation of the wiper, as the arm oscillates across the windshield the blade will be deformed due to its flexible construction, being of rubber, and depending upon the direction of movement, face 82 or 84 will be squeezed on the face not wiping to close the forked passages on that side so that the liquid will flow out through the ports in the wiping face.

The pivotal movement of the ball 62 will permit the blade to adjust itself to the angle of the glass, and while I have here shown a hand pump it is clear that any suitable pressure means may be employed.

Water is normally contained in the tank but in winter it may be desirable to add or substitute a solution to prevent the formation of ice on the glass.

Having thus fully described my invention what I claim as new and desire to secure by Letters Patent is:

1. A windshield wiper comprising a hollow bar formed with a longitudinally extending slot along its side portion and with a liquid inlet opening substantially opposite the slot, and a blade formed of rubber and having an elongated body triangular in cross section and a tubular mounting rib closed at its ends and connected with the body by a narrow neck, said rib fitting snugly in the hollow bar and formed with an inlet opening registering with the inlet opening of the bar, the said neck projecting from the bar through the slot thereof, and said blade being formed with longitudinally spaced liquid passages each having branches extending from opposite sides thereof to side faces of the body.

2. A windshield wiper comprising a hollow bar formed with a longitudinally extending slot along its side portion and with a liquid inlet opposite the slot midway the length of the bar, and a rubber blade carried by said bar and having a hollow mounting rib fitting into the bar and formed with an inlet opening registering with the inlet of the bar, there being a web extending from said rib through the slot in the bar and carrying a body extending longitudinally of the blade and disposed in outwardly spaced relation to the bar, said body being formed with side faces converging and intersecting to form a glass-engaging edge for the blade, the said side faces of the body being formed with longitudinally extending lips spaced from each other, and the blade being formed with liquid passages extending from the hollow rib through the neck into said head and having extensions leading from opposite sides thereof to portions of the said side faces of the body between the lips.

ROY M. PIERCE.

REFERENCES CITED

The following references are of record in the file of this patent:

UNITED STATES PATENTS

| Number | Name | Date |
|---|---|---|
| 1,857,419 | Williams | May 10, 1932 |
| 1,950,588 | Anderson | Mar. 13, 1934 |
| 2,069,699 | Dohler | Feb. 2, 1937 |
| 2,168,202 | Grantham | Aug. 1, 1939 |
| 2,173,021 | Longwell | Sept. 12, 1939 |